UNITED STATES PATENT OFFICE.

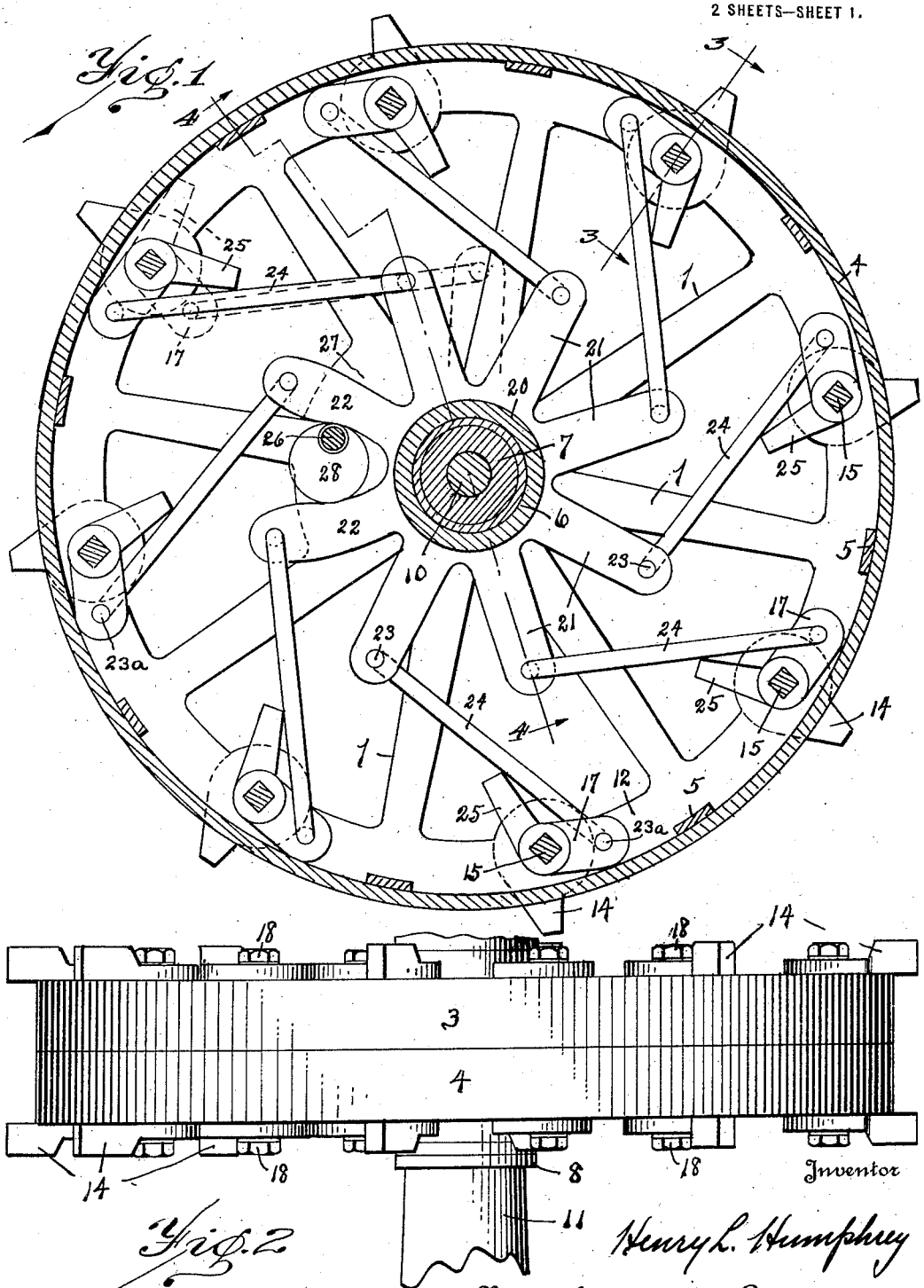

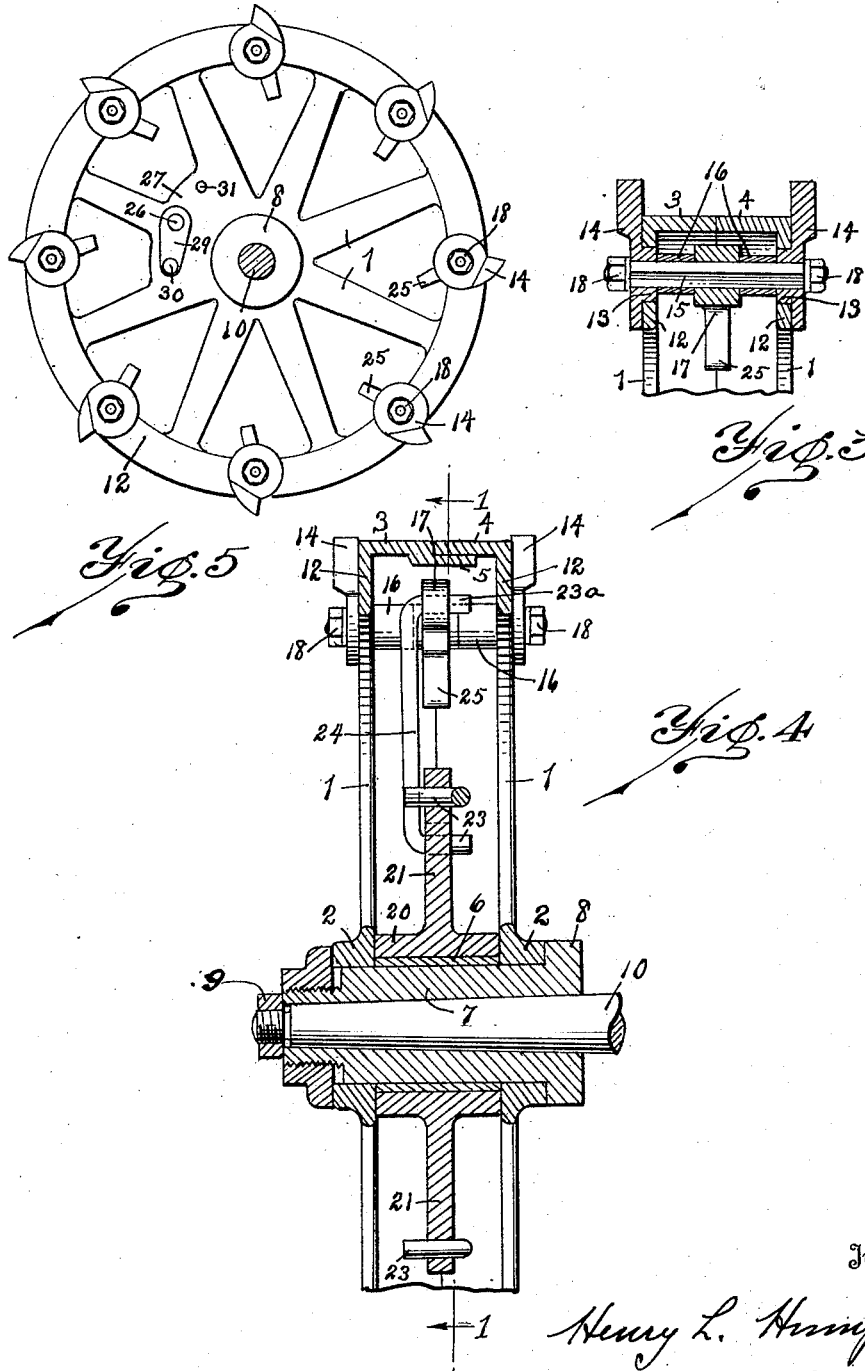

HENRY L. HUMPHREY, OF MONROE, MICHIGAN.

TRACTOR WHEEL.

1,408,885.	Specification of Letters Patent.	Patented Mar. 7, 1922.

Application filed April 6, 1921. Serial No. 458,980.

*To all whom it may concern:*

Be it known that I, HENRY L. HUMPHREY, a citizen of the United States, and residing at Monroe, in the county of Monroe and State of Michigan, have invented a new and Improved Tractor Wheel, of which the following is a specification.

This invention relates to means for adjustably mounting dogs, lugs or fingers at the peripheries of the tractor wheels of self propelled vehicles in such a manner that the fingers may be swung out to engage the roadway or swung in so that the wheel will have a smooth cylindrical rim, and the object of this invention is to provide a wheel of this character with movable members adapted to be swung out or in from the periphery of the rim simultaneously and be locked in either position.

This invention consists in a wheel having a cylindrical rim and a series of dogs, preferably in pairs, pivotally mounted adjacent the side edges of the rim, pivots for the dogs mounted parallel to the rim, and means mounted on the hub of the wheel to swing the dogs in and out.

It further consists in the details of construction illustrated in the accompanying drawing and particularly pointed out in the claims.

In the drawings, Fig. 1 is a section of a wheel embodying the present invention on the line 1—1 of Fig. 4. Fig. 2 is a plan of the wheel. Figs. 3 and 4 are sections of the lines 3—3 and 4—4 respectively of Fig. 1. Fig. 5 is a side elevation of the wheel on a smaller scale.

Similar reference characters refer to like parts throughout the several views.

The wheel shown in the drawings is preferably of two parts, each part having spokes 1, a part hub 2 and a part rim 3 and 4, the part rim 3 having tongues 5 which extend within the part rim 4. Any other desired means may be employed to cause the part rims to keep in alinement. Between the part hubs 2 is a short sleeve 6 and the hubs 2 and sleeves 6 may be mounted on a skein 7 having a flange 8 against which the parts are pressed by a nut 9. An axle 10 is shown extending into the skein or hub of the wheel, but any other desired connection between the hub of the wheel and axle may be employed. In Fig. 2 I have shown the end 11 of the usual axle casing.

Along the outer edges of the part rims 3 and 4 are inwardly extending flanges 12 provided with holes to receive the hubs 13 (Fig. 3) of the pairs of dogs 14. These hubs are preferably provided with square holes to receive the shafts 15 which also extend through the collars 16 and the crank arm 17, the ends of the shafts being reduced and threaded to receive the nuts 18. The collars 16 are preferably short lengths of pipe and the pair of dogs, the shaft and the crank act as a single integral member.

Mounted on the sleeve 6 is the hub 20 from which extend the radial arms 21 and 22 provided with holes in their outer ends (Fig. 4) to receive the laterally turned inner ends 23 of the links 24, whose laterally turned outer ends 23ª extend through holes in the ends of the crank arms 17. Extending from each of these crank arms, as shown in Fig. 1, is a stop arm 25 which engages the rim when the dogs are swung in, the crank arms engaging the rim when the dogs are swung out.

Any desired means may be provided to turn the hub 20 and move the arms 21 and 22 relative to the rim. I have shown a shaft 26 mounted in plates 27 between a group of three spokes on each side of the wheel and on this shaft is an eccentric 28 between the two arms 22. A handle 29 is resilient and a pin 30 mounted in the outer end thereof is adapted to enter one or the other of the holes 31 and thus hold the handle 29, eccentric 28 and the arms 21 and 22 in either of their two final positions and thus hold the dogs swung out or in. These arms 21 and 22 and the links 24 have been omitted in Fig. 5, which merely shows the outside of the wheel and the handle for positioning the eccentric 28.

As the tractor wheel is intended to turn to the left in Figs. 1 and 5, that is, counterclockwise, the stresses on the dogs are taken up by the crank arms 17 bearing against the rim and not by the links 24, arm 21 and 22 and the eccentric 28.

The details and proportion of the various parts of this tractor wheel may all be changed by those skilled in the art without departing from the spirit of my invention as set forth in the following claims.

I claim:—

1. In a traction wheel, the combination of a hub, spokes and a rim having inwardly extending flanges along its edges, the flanges being provided with holes, dogs positioned along the flanges and having hubs extending into said holes, shafts extending across through the hubs of the dogs, crank arms on the shafts adapted to swing the dogs in and out from the rim, and means to swing the crank arms.

2. A tractor wheel comprising a hub, spokes and a rim, a series of shafts mounted parallel to the axis of the wheel adjacent the rim, a dog on each end of each shaft at the edges of the rim, means to swing the shafts to move the dogs to extend beyond the rim or to lie within the periphery of the rim at will, and means to limit the movement of each shaft in both directions.

3. In a traction wheel, the combination of a hub, spokes and a rim having inwardly extending flanges along its edges, the flanges being provided with holes, dogs positioned along the flanges and having hubs extending into said holes, shafts extending across through the hubs of the dogs, crank arms on the shafts adapted to swing the dogs in and out from the rim, means to swing the crank arms comprising a hub rotatable on the hub of the wheel arms extending therefrom, and links extending from the ends of said arms to the crank arms on the dog shafts.

4. In a tractor wheel, the combination of a hub, spokes and a rim, shafts mounted parallel to the rim on its inner side, dogs mounted on the ends of the shafts and adapted to swing out beyond the periphery of the rim, crank arms and stop arms on said shafts adapted to limit the inward and outward movements of the dogs by contacting with the rim, a hub mounted concentric with the hub of the wheel and arms extending therefrom, links extending from the ends of said arms to the crank arms, and means to rotate said hubs relative to each other.

5. In a tractor wheel, the combination of a hub, a cylindrical rim having inwardly extending flanges along its edge provided with apertures, spokes extending inwardly from the flanges, part-hubs connecting the inner ends of the spokes, a skein on which the part-hubs are mounted, a series of shafts extending through the apertures in said flanges, dogs on the ends of the shafts and adapted to be swung thereby to extend beyond the periphery of the rim, crank arms mounted on the shafts between the flanges and stop arms on the crank arms whereby the movements of the dogs may be limited, a hub mounted on the skein between the part-hubs and arms extending therefrom, links connecting said arms to the crank arms, and means to turn the hub and its arms to cause the dogs to swing in or out.

HENRY L. HUMPHREY.